United States Patent [19]

Usner

[11] Patent Number: 5,415,299

[45] Date of Patent: May 16, 1995

[54] GARMENT HANGER SUPPORT SYSTEM

[76] Inventor: Daniel C. Usner, 9535 Greystone Pkwy., Brecksville, Ohio 44141

[21] Appl. No.: 66,760

[22] Filed: May 25, 1993

[51] Int. Cl.⁶ ............................................. A47H 1/02
[52] U.S. Cl. ................................. 211/105.1; 211/123; 211/113; 248/251; 224/313
[58] Field of Search ...................... 211/105.1, 124, 123, 211/113, 162; 248/251; 198/680, 682, 685, 678.1, 465.4; 410/89, 92; 224/313, 311

[56] References Cited

U.S. PATENT DOCUMENTS

| | | | |
|---|---|---|---|
| 2,528,358 | 10/1950 | Grass | 248/251 |
| 3,278,149 | 10/1966 | Brucker | 248/251 X |
| 3,286,850 | 11/1966 | Ruhnke | 211/105.1 |
| 3,907,118 | 9/1975 | Pelavin | 211/113 |
| 3,921,814 | 11/1975 | Solomon | 211/124 X |
| 3,990,582 | 11/1976 | Schindel | 248/251 X |
| 4,079,840 | 3/1978 | Usner . | |
| 4,139,102 | 2/1979 | Winton | 211/124 |
| 4,316,547 | 2/1982 | Varon | 211/105.1 |
| 4,351,241 | 9/1982 | Brems et al. | 198/465.4 X |
| 4,557,516 | 12/1985 | Usner . | |
| 4,671,419 | 6/1987 | Beverly | 211/105.1 |
| 5,050,833 | 9/1991 | Usner . | |

FOREIGN PATENT DOCUMENTS

| | | | |
|---|---|---|---|
| 524414 | 12/1953 | Belgium | 211/162 |
| 671579 | 10/1963 | Canada | 410/89 |

Primary Examiner—Blair M. Johnson
Attorney, Agent, or Firm—Ralph E. Jocke

[57] ABSTRACT

A garment hanger support system suitable for transporting hanging garments in high-density packed arrangement in a truck, trailer, freight container or other enclosure includes a first support member (12) for moving hanger slings (14) or other garment hangers thereon. The first support member is supported by a plurality of second support members (18) having a first end portion (20) in overlying supported relation with a first frame member (50). The second support member further includes a second end portion (26) including an arm portion (28) for supporting the first support member. The first frame members extend between second frame members (52) and are connected by brackets (56) that are selectively engagable in apertures (54) in the second frame members. A guard member (68) overlies the first support member to prevent unintentional disengagement of the hanger slings during transport. The number and position of the first frame members and the second support members may be readily modified to adapt the system to carrying garments of different types.

26 Claims, 6 Drawing Sheets

GARMENT HANGER SUPPORT SYSTEM

TECHNICAL FIELD

This invention relates to systems for supporting garment hangers. Specifically this invention relates to a system for supporting movable garment hanging devices in a movable enclosure such as a truck, semi-trailer or cargo container.

BACKGROUND ART

It is often necessary to transport garments between locations. Garments are frequently transported on hangers from the manufacturer to a warehouse. Later, the garments may again be transported to a distribution center, and then eventually transported to a retail store. Transporting garments on hangers has advantages in that the garments will not get creased, which happens when they are transported folded. Transporting garments on hangers or hanging devices enables arrangement of the garments in logical order, such as by type and size, during shipping. This reduces the amount of work needed to sort the garments when they are unloaded at the destination.

Hanging garments are usually transported on an apparatus that may be rolled along a rod or other track means inside the enclosure. Examples of such hanging apparatus are shown in my U.S. Pat. No. 5,050,833 which is a multiple hanger support sling. Another type of movable apparatus for supporting garments is a trolley bar such as that shown in my U.S. Pat. No. 4,079,840. Of course, other types of garment hanger apparatus may be used to transport garments including hangers with conventional hooks that may be slid axially along a track means or support bar.

When clothing is transported it is desirable to pack the clothing as densely as possible in the truck, trailer or shipping container. Dense packing creates a heavy load which must be supported. As a result, it has been necessary to build support systems for the bars or other track means inside the enclosure so that they can withstand the load. This often involves making a special supporting framework that is fixed in place. Making and installing such systems is expensive.

A further drawback associated with prior art garment supporting systems is that once the system is installed it is difficult to change. A support system that is installed in a semi-trailer, for example, to carry one type of garment hanger or garment length, is generally not well-suited to carry a different type of hanger or garment. As a result, space may be wasted when another type of garment is carried, or substantial cost must be incurred to modify the support system.

Periodically, semi-trailers or other shipping containers become damaged, or are replaced. Permanently installed prior art support systems cannot be readily removed and must usually be scrapped with the container.

A further drawback of prior art support systems is that they are usually designed for only one type of garment hanger apparatus. Such systems may not be effectively used with other types of garment hanger apparatus, which further limits their flexibility.

Thus, there exists a need for a garment hanger support system that is inexpensive to manufacture and install in trucks, trailers and other shipping containers, and which may be readily changed to suit different types of hanging garments, or removed. Further, there exists a need for a garment hanger support system that may be used with the various types of movable garment hanger apparatus.

DISCLOSURE OF INVENTION

It is an object of the present invention to provide a garment hanger support system that is readily manufactured.

It is a further object of the present invention to provide a garment hanger support system that is readily installed in a truck, trailer or other shipping container.

It is a further object of the present invention to provide a garment hanger support system that is readily modified to accommodate different garment types.

It is a further object of the present invention to provide a garment hanger support system that has high load bearing capability.

It is a further object of the present invention to provide a garment hanger support system that is suitable for use with various standard types of garment hanger apparatus.

It is a further object of the present invention to provide a garment hanger support system that minimizes the risk of unintended disengagement of garment hanger apparatus during transport.

It is a further object of the present invention to provide a garment hanger support system that may be readily removed.

Further objects of the present invention will be made apparent in the following Best Modes For Carrying Out Invention and the appended claims.

The foregoing objects are accomplished in the preferred embodiment of the present invention by a garment hanger support system in which garment hanging apparatus may be moved longitudinally on a first supporting member which serves as a track means. The track means is supported at spaced intervals from the bottom by second supporting members.

Each second supporting member includes a first sidewall portion with an arm portion that supports the track means. The first sidewall portion extends upward to a generally horizontally extending top wall portion. A second sidewall portion extends downward from the top wall portion generally parallel to the first side wall portion of the member.

A first rectangular frame member extends between the sidewall portions of the second supporting member. The second support member is slidably positionable on the first frame member. The first frame member is supported between spaced second frame members, which are attached to the parallel spaced walls of the enclosure.

The second frame members include apertures therein. Brackets with projecting engaging portions are engaged in the apertures. The brackets each include a recess for accepting a first frame member. As a result, the first frame members may be selectively positioned along the second frame members. Additional second frame members may be provided at different elevations in the enclosure, which enables the elevation of the garments supported by the system to be changed.

When installed, the first frame members support multiple second support members, which in turn support multiple track means. As a result, the spacing of the track means may be readily changed by modifying the locations of the second support members. Further, the elevation of the track means may also be changed by extending the first frame members between second frame members at different elevations. The load bearing capability of the system may also be modified by changing the spacing and number of the first frame members and second supporting members which support the track means.

BEST MODES FOR CARRYING OUT INVENTION

Figure 1:
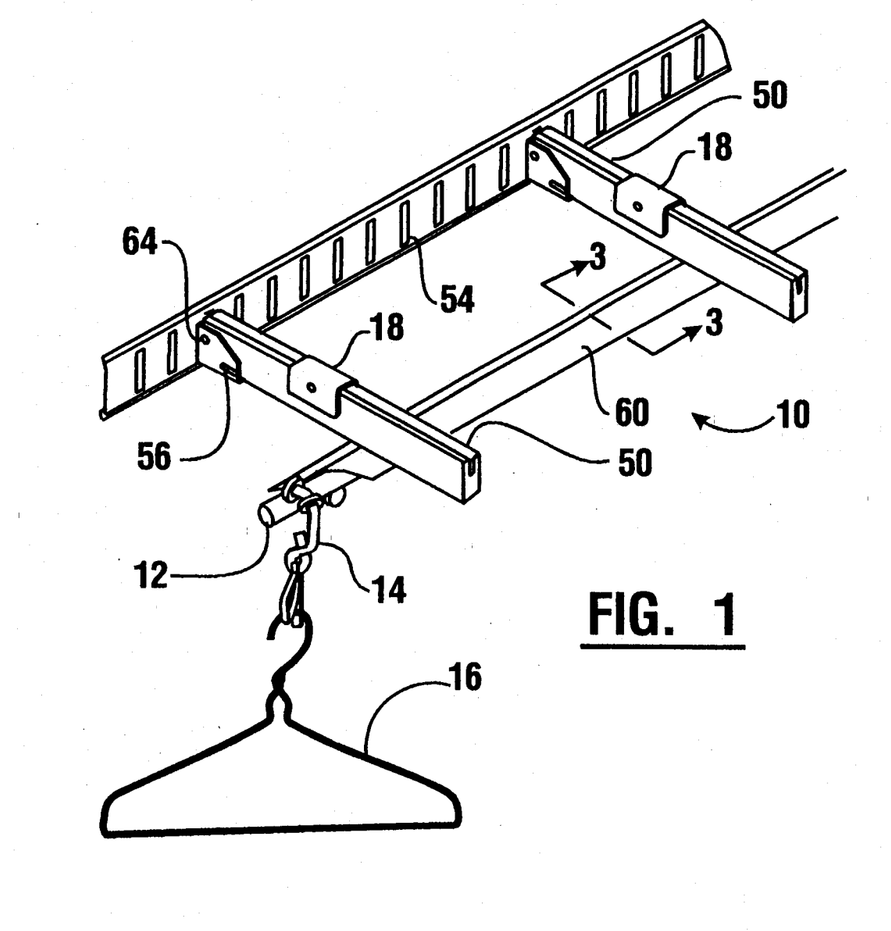
FIG. 1 is an isometric view of the garment hanger support system of the present invention.

Referring now to the drawings and particularly to FIG. 1, there is shown therein the preferred embodiment of the garment hanger support system of the present invention generally indicated 10. The system includes a first support member 12, which in the preferred form of the invention is a cylindrical member. Member 12 serves as track means for supporting rolling hanger slings 14, which in operation are adapted for supporting conventional garment hangers 16. Member 12 supports a large number of slings 14, and each sling supports a number of hangers 16, each of which carries a garment.

Member 12 is supported by a second support member 18. Second support member 18 has a first end portion 20 (See FIGS. 5 through 7). First end portion 20 includes a top wall portion 22. A first sidewall portion 24 extends from the first end portion to a second end portion 26. First side wall portion 24 terminates adjacent second end portion 26 in a J-shaped arm portion 28.

Figure 2:
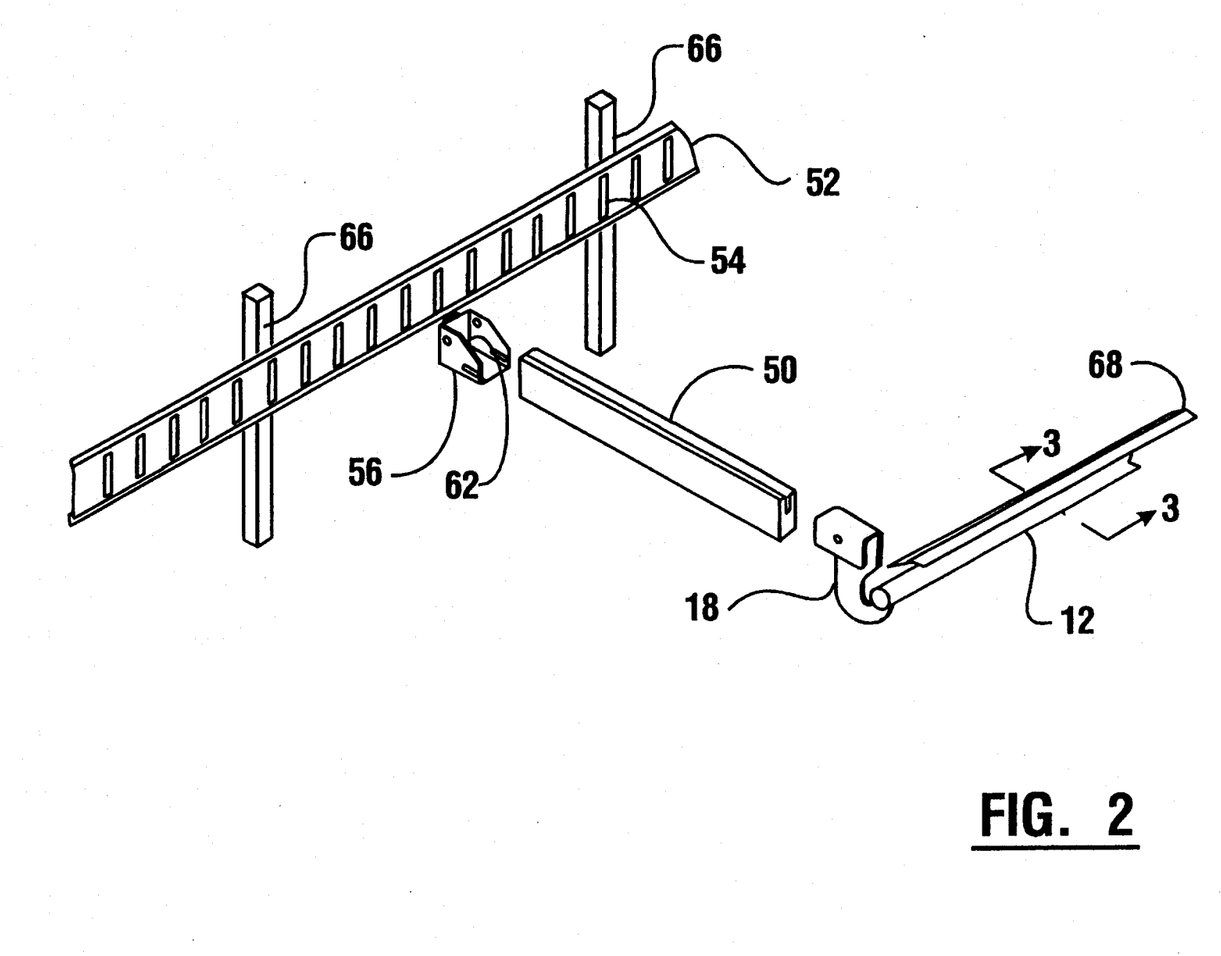
FIG. 2 is an isometric exploded view of the garment hanger support system of the present invention.

Arm portion 28 terminates at a first tab portion 30. Tab portion 30 is adapted for supporting a bottom area of first support member 12, as shown in FIGS. 1 and 2. Tab portion 30 includes a hole 32 which is used to provide access for a fastener such as a self-threading bolt which holds member 12 to the tab portion.

Figure 5:
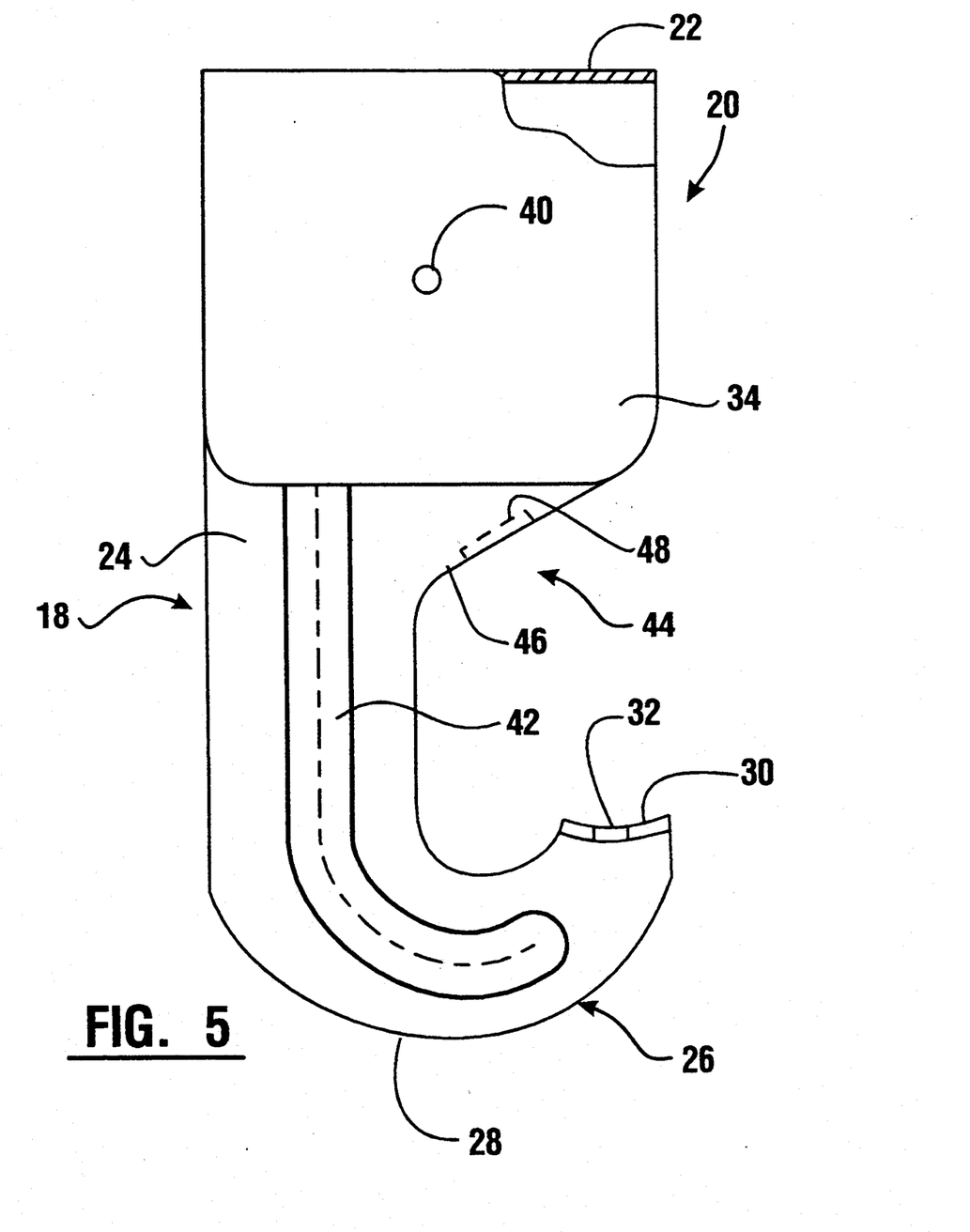
FIG. 5 is a partially sectioned, right side view of the second support member of the system.
Figure 6:
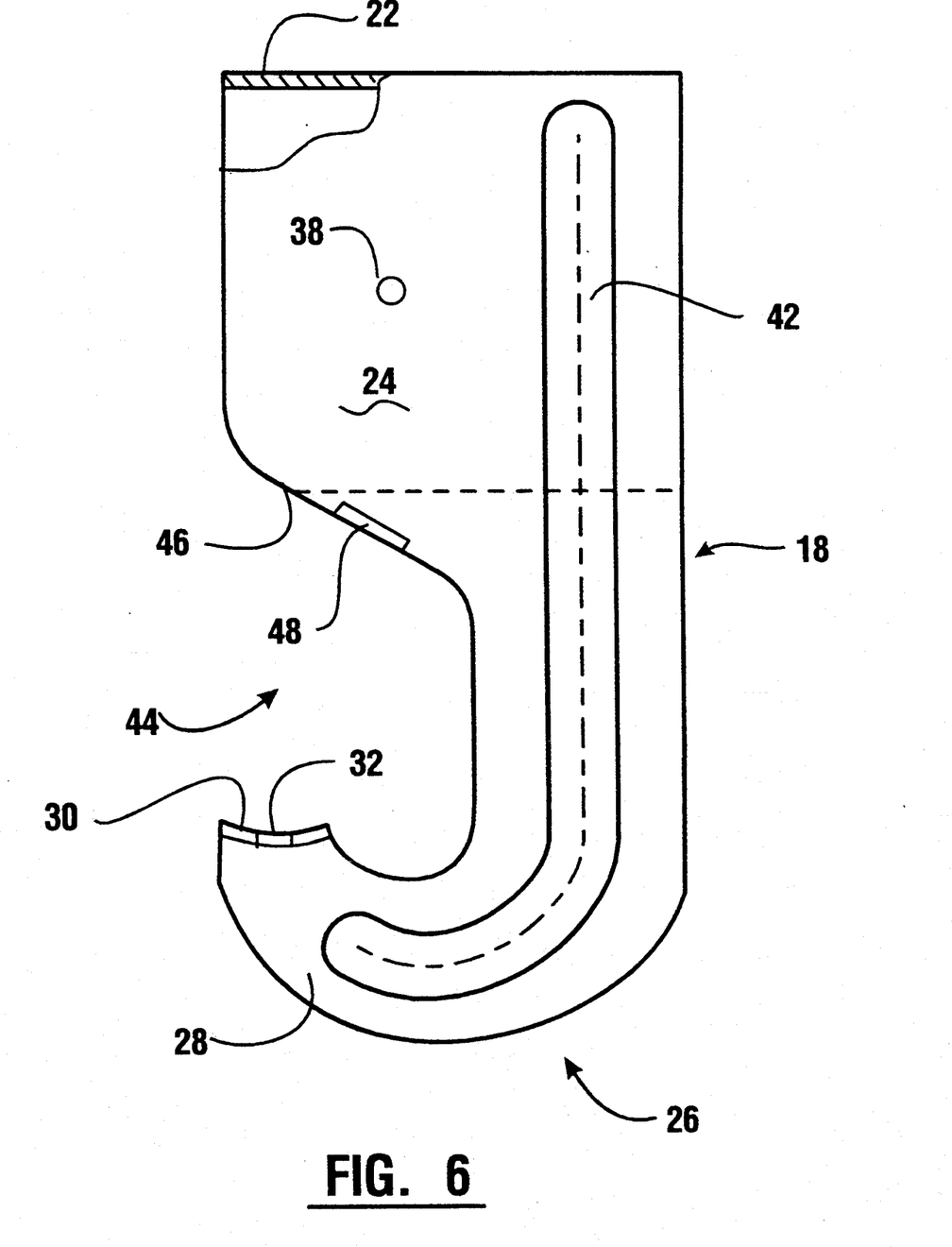
FIG. 6 is a partially sectioned left side view of the member shown in FIG. 5.
Figure 7:
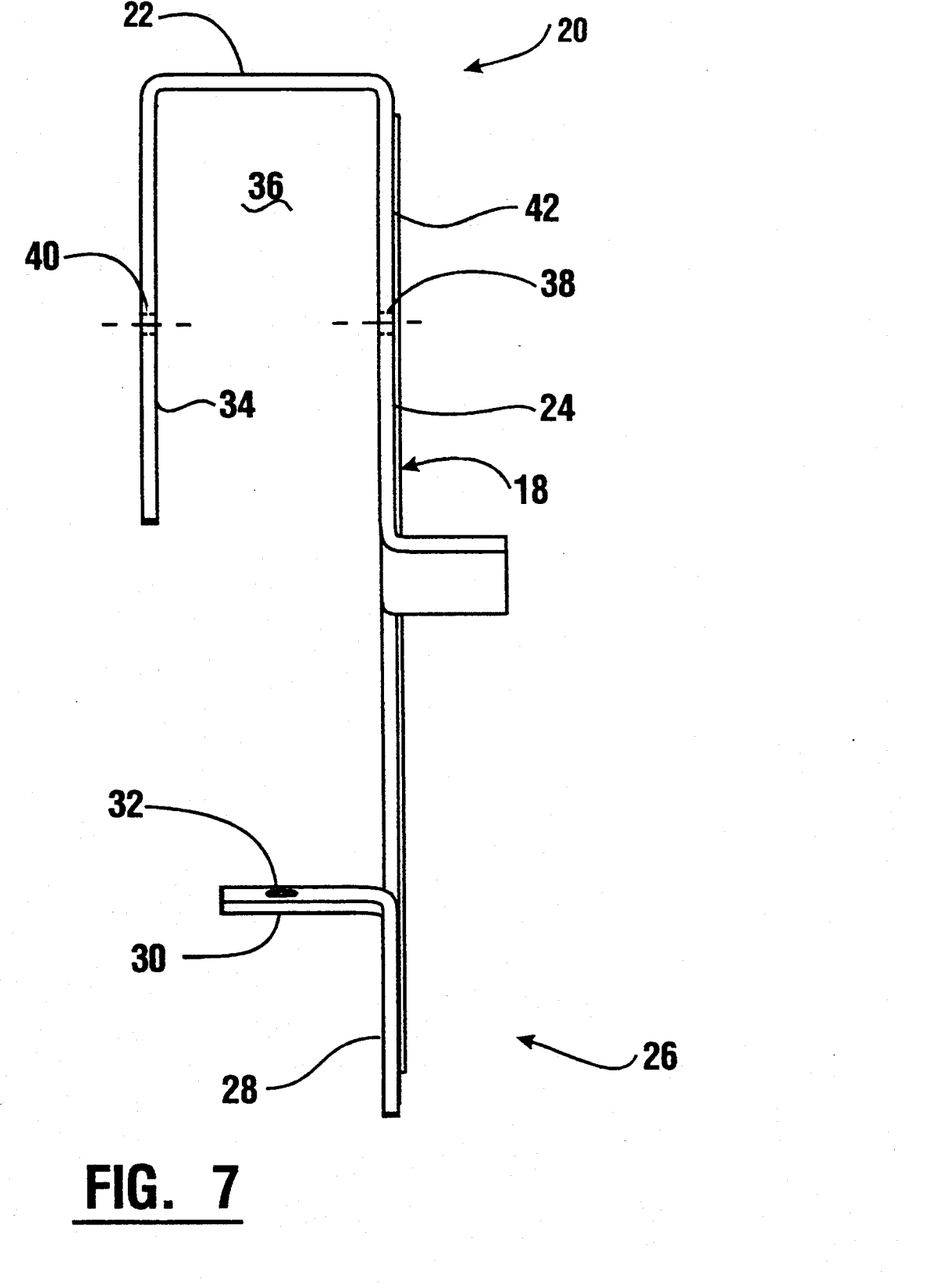
FIG. 7 is a front view of the member shown in FIG. 5.

Second support member 18 further includes a second sidewall portion 34. Second sidewall portion 34 extends parallel to the first sidewall portion 24, but in the preferred embodiment, is shorter. The first and second sidewall portions and top wall portion 22 bound an interior area 36. The first and second sidewall portions also include holes 38 and 40 respectively, which extend therethrough. The purpose of holes 38 and 40 is later explained.

The first sidewall portion 24 also incorporates a contoured area 42. Contoured area 42 is stamped into the metal and adds strength to the support member to help avoid twisting of the first sidewall portion when it is under load.

Second support member 18 also includes a clearance area 44. Clearance area 44 is vertically above first support member 12 when it is attached to member 18. Clearance area 44 is bounded upwardly by an angled edge 46 of member 18. A second tab portion 48 extends outward and generally parallel to the angled edge. The purpose of tab portion 48 is later explained.

Referring again to FIGS. 1 and 2, first frame members 50 extend generally perpendicular to the axis of member 12. First frame members 50 in the preferred embodiment are hollow, formed rectangular members. Frame members 50 are sized to be accepted in area 36 between the sidewall portions of second support member 18. The first end portion 20 of member 18 is adapted to nest in overlying relation with a first frame member 50, and to be supported thereby.

Second support members 18 are adapted to be slid along members 50 for purposes of positioning. Once in position, members 18 may be fixed to frame members 50 using fasteners such as rivets or self-threading bolts, which extend through either one or both of holes 38 and 40, into drilled holes or other suitable accepting means in frame members 50.

Each first frame member 50 is supported between second frame members 52, only one of which is shown in FIGS. 1 and 2. Second frame members 52 are commercially available material known as "E-channel". Second frame members 52 include a plurality of spaced vertical slots or apertures 54 which extend therethrough.

Figure 4:
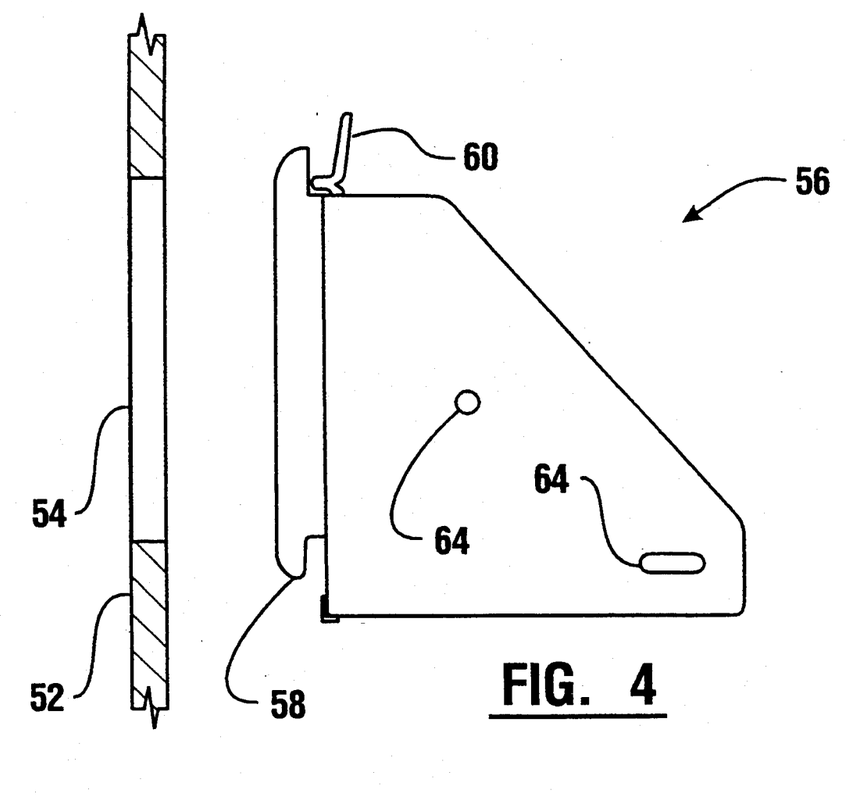
FIG. 4 is a side view of a bracket for connecting the frame members of the system.

Brackets 56 are used to connect the first and second frame members. A bracket 56 is shown in detail in FIG. 4. The bracket has a tongue portion 58 on its back side which is sized for acceptance in apertures 54. A leaf spring tab 60 mounted on the bracket may be pulled back so that the top of tongue portion 58 may be slid into the top area of the aperture. With the top of tongue portion 58 in the aperture, the bracket is rotated so that the bottom area of the tongue portion is accepted into the aperture. Once this is done, the bracket 56 is pulled downward, and upon release of spring 60, the tongue portion 58 is locked in the aperture. Spring 60 serves to hold the bracket in place despite vibration or impacts that may occur. In addition, the brackets 56 may be readily released and repositioned in different apertures, when it is desired to change the configuration of the system.

Bracket 56 further includes a recess 62 (See FIG. 2) which is sized for accepting first frame members 50. Bracket 56 further includes holes 64 in its side walls which may be used to hold frame members 50 therein using fasteners such as self-threading bolts, which may be threaded into holes in the ends of frame members 50.

As shown in FIG. 2, frame member 52 is adapted for attachment to the walls of an enclosure, such as the walls of a semi-trailer, truck or container. In FIG. 2, a frame member 52 is shown attached to uprights 66, such as those that would be found inside of a semi-trailer. Frame member 52 may be attached to the uprights by any suitable fastening means such as self-threading bolts or large pop rivets.

Although only one of the second frame members 52 is shown in FIGS. 1 and 2, it will be understood by those skilled in the art that such members are arranged in pairs on opposite walls of the enclosure. Further, it will be appreciated that in some enclosures it may be desirable to have pairs of second frame members 52 installed at several elevations in the enclosure so that the height of the garment supporting member 12 may be readily changed to accommodate the transport of different length garments.

Figure 3:
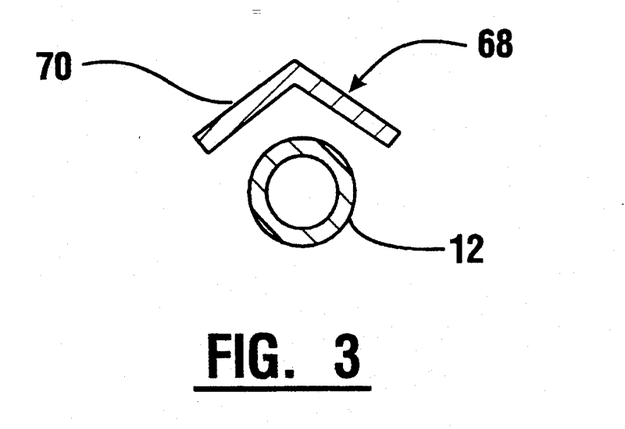
FIG. 3 is a cross-sectional view of the garment hanger support member and guard member taken along line 3—3 in FIGS. 1 and 2.

In FIG. 1, a first guard member 68 is shown in surrounding relation of member 12. As shown in cross-section in FIG. 3, first guard member 68 is a 45 degree angle in cross section. Such a guard member is well adapted for preventing hanger slings from inadvertently disengaging from member 12 due to jostling as the enclosure in which the system is mounted is transported. An inner leg 70 of guard member 68 is held to tab portion 48 of second support member 18 by suitable fasteners (not shown). As will be understood by those skilled in the art, guard member 68 is absent above certain areas of support member 12 so that garment hangers may be engaged or disengaged in those areas to facilitate loading and unloading.

Guard member 68 presents advantages over prior types of guards because it enables member 12 to be used as track means for both hanger slings as well as trolley type hangers. As a result, guard member 68 can be used to prevent accidental disengagement of both types of hanger slings without modification of the system. As a result, it has great versatility. The clearance areas 44 of brackets 18 are likewise sized to enable passage of both hanger slings and trolley-type garment hangers without obstruction.

The garment hanger support system of the present invention has advantages because it may be readily installed in most common types of movable enclosures such as trucks, semi-trailers and shipping containers. No welding or special fabrication is required to install the system. The system may be readily reconfigured by changing the positions of first frame members 50 and support members 18. This may be accomplished quickly by removing and reinstalling the fasteners which hold the members in place. As a result, the system may be modified to achieve the most desirable high-density packing for the garment type being transported. The system is also readily removed and the parts salvaged for installation in other enclosures.

Thus, the garment hanger support system of the present invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover the descriptions and illustrations presented herein are by way of examples and the invention is not limited to the exact details shown or described.

Having described the features, discoveries and principles of the invention, the manner in which it is operated and utilized, and the advantages and useful results attained; the new and useful structures, devices, elements, arrangements, parts, combinations, systems, equipment, operations, methods and relationships are set forth in the appended claims.

I claim:

1. A garment hanger support system comprising:
   a first support member for supporting garment hanger means, said first support member being elongated and extending in a first axial direction;
   a second support member in supporting relation with said first support member; and
   an elongate first frame member in supporting relation with said second support member, said first frame member extending in a transverse direction generally perpendicular of said first axial direction;
   said second support member including a first end portion in overlying engaging relation with said first frame member, and wherein said second support member is movable on said first frame member in the transverse direction, and wherein said second support member further includes a second end portion disposed vertically below said first end portion, said second end portion including an arm portion in supporting relation with a bottom area of said first support member.

2. The system according to claim 1 wherein said second end portion further includes a clearance area in said second support member adjacent said first support member, whereby garment hanging apparatus in engagement with said first support member is enabled to pass said second support member.

3. The garment hanger support system according to claim 2 and further comprising guard means for preventing unintended disengagement of said garment hanger means and said first support member, said guard means overlying said first support member and extending in the first axial direction, and wherein said second support member includes means for securing said guard means to said second support member above said clearance area.

4. The garment hanger support system according to claim 3 wherein said first frame member is in supported relation of a second frame member extending horizontally and generally perpendicular to said first frame member.

5. The system according to claim 4 and further comprising means for connecting said first and second frame members at selected positions longitudinally on said second frame member.

6. The system according to claim 5 wherein said system comprises a pair of second frame members spaced in the traverse direction and a plurality of said first frame members extending horizontally between said second frame members.

7. The system according to claim 6 wherein said system further comprises a plurality of vertically spaced pairs of second frame members whereby said first frame members are selectively vertically positionable.

8. The system according to claim 5 wherein said second supporting member comprises at least one vertically extending first sidewall portion extending between said first and second end portions, and wherein said arm portion is a generally J-shaped arm at a lower end of said first sidewall portion.

9. The system according to claim 8 wherein said clearance area is bounded upwardly by an angled edge of said first sidewall portion, said angled edge increasingly disposed from said first support member with increasing proximity to a vertical axis of said first support member.

10. The system according to claim 9 wherein said first end portion of said second support member includes a top wall portion, said top wall portion in connection with said first sidewall portion and in overlying engaged relation with said first frame member.

11. The system according to claim 10 wherein said second support member further includes a second sidewall portion, said second sidewall portion extending vertically downward from said top portion in disposed relation of said first sidewall portion, and wherein said first frame member is disposed intermediate of said first and second sidewall portions.

12. The system according to claim 11 and further comprising means for mounting said guard means adjacent said angled edge of said second support member.

13. The system according to claim 12 wherein said means for connecting said first and second frame members comprises a plurality of spaced apertures spaced longitudinally along said second frame member, and engaging means in supporting connection with said first frame member for selectively engaging said apertures.

14. The system according to claim 13 wherein said engaging means for engaging said apertures are integral with a bracket, and said bracket includes means for accepting said first frame member therein.

15. The system according to claim 14 and further comprising means for attaching said arm portion of said second support member and said first support member, and wherein said means for attaching includes a first tab portion on said arm portion of said second support member.

16. The system according to claim 15, wherein said means for mounting said guard means includes a second tab portion on said first sidewall portion of said second support member.

17. The system according to claim 16 wherein said guard means overlies said first support member circumferentially, but is disposed from said first support member sufficiently to enable both sling and trolley-type garment hanger apparatus to be movable thereon.

18. The system according to claim 17 wherein said first frame member is generally rectangular in cross-section, and wherein said first support member is generally circular in cross-section.

19. The system according to claim 18, wherein said first support member extends between a plurality of second support members, and wherein the system further comprises a plurality of first frame members, said first frame members spaced from one another in the first axial direction, and wherein each first frame member is in supporting relation with said plurality of second support members.

20. The system according to claim 1 wherein said second supporting member comprises at least one vertically extending first sidewall portion extending between said first and second end portions, and wherein said arm portion is a generally J-shaped arm at a lower end of said first sidewall portion, and wherein said first end portion includes a top wall portion extending transversely from said first sidewall portion and a second sidewall portion extending downward from said top wall portion and parallel to said second sidewall portion, and wherein said first frame member extends between said first and second sidewall portions and below said top wall portion.

21. In a garment hanger support system, a support member comprising:
a first end portion including a top wall portion engaging a first frame member, said top wall portion in overlying relation of said first frame member, said first end portion movable along an axis of said first frame member;
a first sidewall portion extending from said top wall portion to a second end portion spaced from said first end portion, said second end portion including an upwardly extending arm portion having a free end, said free end supporting a garment track means in a bottom area thereof, said track means adapted for moving garment hanger supporting apparatus thereon, said track means extending in a direction generally transverse of said axis of said first frame member; and
said first side wall portion including a clearance area adapted for enabling garment hanger supporting apparatus to pass therethrough on said track means.

22. The member according to claim 21 and further comprising a second sidewall portion extending from said top wall portion generally parallel and in the same direction as said first sidewall portion, and wherein said first and second sidewall portions bound an area adapted for accepting a first frame member therein.

23. The member according to claim 19 wherein said first sidewall portion includes tab means for attaching a guard member thereto, said guard member adapted for preventing disengagement of said track means and said garment hanger supporting apparatus.

24. A garment hanger supporting apparatus in an interior of a movable enclosure, said enclosure bounded by a pair of spaced generally parallel enclosure walls, comprising:
a plurality of horizontally extending track means supporting garment hanger means for supporting garments thereon, said garment hanger means movable longitudinally on said track means;
a plurality of support members, each said support member in supporting relation of said track means;
a plurality of horizontally extending first frame members, said first frame members in supporting relation of at least one of said support members;
each said support member comprising a first end portion in overlying engaging relation of a first frame member, each said support member including a first wall portion extending from said first end portion, said first wall portion including an upwardly extending arm portion, said arm portion having a free end in supporting relation of a bottom area of said track means;
at least one pair of second frame members, each said second frame member of said pair mounted in supported relation with one of said enclosure walls, said first frame members extending between said second frame members and in supported relation therewith; and
means for selectively connecting said second frame members with said first frame members at positions longitudinally along said second frame members.

25. The system according to claim 24 wherein said support members are selectively movable longitudinally on said first frame members.

26. The system according to claim 25 wherein said system further comprises a plurality of second frame members extending generally parallel to one another and at different vertical elevations in said enclosure.

* * * * *